(12) United States Patent
Tseng

(10) Patent No.: US 9,400,040 B2
(45) Date of Patent: Jul. 26, 2016

(54) ACTUATOR WITH MULTI-STAGE GEARS

(71) Applicant: TIMOTION TECHNOLOGY CO., LTD., New Taipei (TW)

(72) Inventor: Kuan-Shu Tseng, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 415 days.

(21) Appl. No.: 14/046,572

(22) Filed: Oct. 4, 2013

(65) Prior Publication Data

US 2015/0047443 A1 Feb. 19, 2015

(30) Foreign Application Priority Data

Aug. 13, 2013 (TW) .............................. 102215207 U

(51) Int. Cl.
*F16H 25/20* (2006.01)

(52) U.S. Cl.
CPC ............ *F16H 25/20* (2013.01); *F16H 25/2056* (2013.01); *F16H 2025/2075* (2013.01); *F16H 2025/2087* (2013.01); *Y10T 74/18576* (2015.01)

(58) Field of Classification Search
CPC ................. F16H 2025/2087; F16H 2025/2075
USPC .......................................................... 475/338
See application file for complete search history.

(56) References Cited

U.S. PATENT DOCUMENTS

| 3,499,344 | A | * | 3/1970 | Pickles | ................ | B60N 2/0224 |
| | | | | | | 475/149 |
| 5,118,082 | A | * | 6/1992 | Byun | ........................ | B66F 3/20 |
| | | | | | | 254/102 |
| 6,257,303 | B1 | * | 7/2001 | Coubray | ................. | E05F 15/67 |
| | | | | | | 160/188 |
| 2006/0084544 | A1 | * | 4/2006 | Chou | ........................ | F16H 1/46 |
| | | | | | | 475/110 |
| 2009/0270220 | A1 | * | 10/2009 | Fukano | ..................... | F16H 3/54 |
| | | | | | | 475/300 |
| 2011/0061574 | A1 | * | 3/2011 | Klinke | ..................... | A47B 9/04 |
| | | | | | | 108/147.19 |

* cited by examiner

*Primary Examiner* — Justin Holmes
*Assistant Examiner* — Stacey Fluhart
(74) *Attorney, Agent, or Firm* — Chiun-Ming Shih; HDLS IPR Services

(57) ABSTRACT

An actuator with multi-stage gears includes a worm gear shaft driving assembly having a worm gear shaft, an electric motor having a transmission shaft, an annulus gear arranged between the worm gear shaft and the transmission shaft, and a plurality of multi-stage gears. The annulus gear includes an inner gear and a moving end actuated cooperatively with the inner gear on two ends thereof. The moving end is connected to and driving the worm gear shaft to rotate; each multi-stage gear is arranged between the transmission shaft and the inner gear; each multi-stage gear includes a first and a second outer diameter portions. The outer circumferential edges of the first and second outer diameter portions includes a helical gear engaged with the transmission shaft and a spur gear engaged with the inner gear respectively. Therefore, the actuator has merits of simplified components and reduced volume.

11 Claims, 11 Drawing Sheets

ACTUATOR WITH MULTI-STAGE GEARS

BACKGROUND OF THE INVENTION

1. Field of the Invention

The present invention is related to an actuator, in particular, to an actuator with multi-stage gears.

2. Description of Related Art

Actuators used in such as conference tables, electric hospital beds, fitness equipment and wheel chairs for adjusting and modifying the height and tilting angle of the positions thereof are common and applied widely.

Traditional actuators typically comprise a worm gear shaft driving assembly, an electric motor and a planetary gear assembly. The worm gear shaft driving assembly comprises a worm gear; the electric motor comprises a transmission shaft; the planetary worm gear assembly comprises an annulus gear, a sun gear and a plurality of planetary gears. The annulus gear is connected to the worm gear shaft and comprises an inner gear at an inner circumferential edge thereof; the sun gear is connected to the transmission shaft and is provided at the inner portion of the inner gear; the plurality of the planetary gears are engaged with the inner gear and the sun gear such that the worm gear shaft driving assembly is connected to the electric motor via the planetary gear assembly in order to allow the transmission shaft to stably drive the worm gear shaft to rotate.

However, as modern products are designed to be lighter in weight and smaller in size, the actuator installed inside the product would also be required to be of the characteristic of being light in weight and small in size. Nevertheless, since the aforementioned annulus gear, sun gear and the planetary gear must engage with each other and the gear teeth path needs to be within a predetermined value, the volume of the planetary gear assembly cannot be reduced, which in turns poses difficulties in reducing the volume of the actuator.

In view of the above, the inventor of the present invention seeks to overcome the aforementioned drawbacks of the currently existing technology with great efforts in research and development along with the use of theories, which serves as the goal for improvement the inventor wishes to accomplish.

SUMMARY OF THE INVENTION

An objective of the present invention is to provide an actuator with multi-stage gears which utilizes multi-stage gears in replacement of known sun gear and planetary gears in order to reduce the components of the actuator such that the effect of having an actuator with a reduced volume can be achieved.

To achieve the aforementioned objective, the present invention provides an actuator with multi-stage gears, comprising:

a worm gear shaft driving assembly comprising a worm gear shaft;

an electric motor having a transmission shaft;

an annulus gear arranged between the worm gear shaft and the transmission shaft; the annulus gear comprising an inner gear on one end thereof and a moving end actuated cooperatively with the inner gear on another end thereof; the moving end connected to the worm gear shaft and driving the worm gear shaft to rotate; and a plurality of multi-stage gears arranged between the transmission shaft and the inner gear; each one of the plurality of multi-stage gears having a first outer diameter portion and a second outer diameter portion; the first outer diameter portion comprising a helical gear on an outer circumferential edge thereof; the second outer diameter portion comprising a spur gear on an outer circumferential edge thereof; the helical gears engaged with the transmission shaft correspondingly; the spur gears engaged with the inner gear correspondingly.

The present invention further includes the following effects and merits:

First, the inner portion of the annulus gear of the present invention requires only a number of spur gears such that the outer diameter of the annulus gear can be effectively reduced in order to allow the actuator to have merits of having simplified components and reduced volume.

Second, the spur gear and the helical gear are formed altogether on an identical component to allow the energy transfer between the spur gear and the helical gear to be more stable in order to strength the transmission shaft to stably transmit to the worm gear shaft to rotate.

Third, each one of the multi-stage gears can be constructed by the metal shaft and the plastic ring connected to the circumference of the metal shaft via the injection molding method, in which the first outer diameter portion is formed on the plastic ring and the second outer diameter portion is formed on the metal shaft such that the engagement between the transmission shaft and the helical gear of the plastic material of the present invention would generate less noise in order to achieve the effect of silence of the actuator of the present invention.

Fourth, the actuator of the present invention further comprises extendable cylinder assembly and anti-sway rings, in which each one of the anti-sway rings comprises a plurality of protruding strips on the outer circumferential edge thereof and the cylinders are correspondingly mounted onto the anti-sway rings to be pressed firmly by the protruding strips in position such that precise cooperation between the cylinders and the anti-sway rings can be achieved.

DETAILED DESCRIPTION OF THE INVENTION

Figure 1:
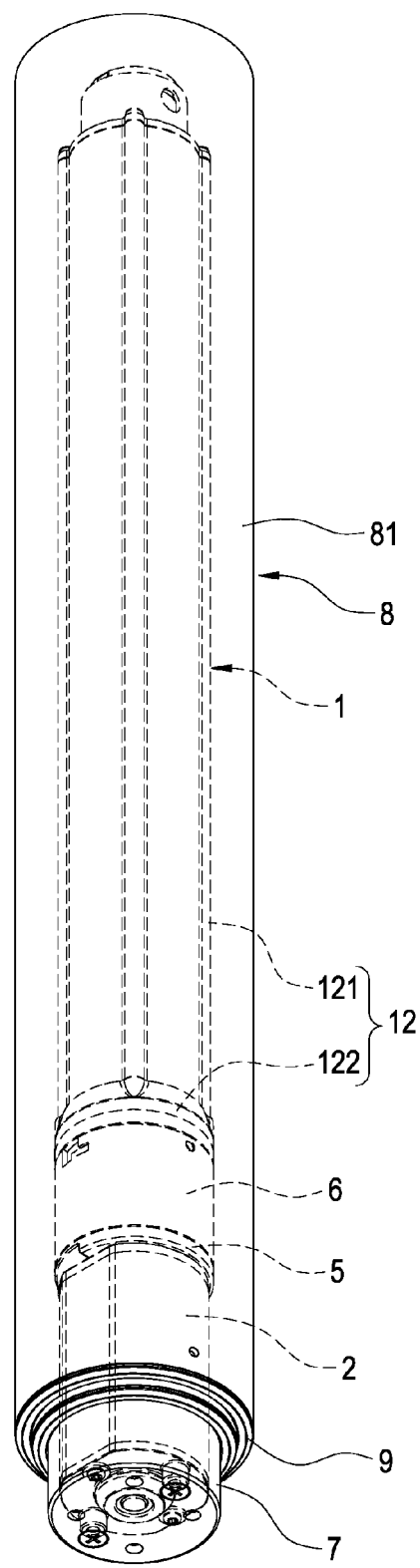
FIG. 1 is a perspective view showing an assembly of the actuator of the present invention.
Figure 2:
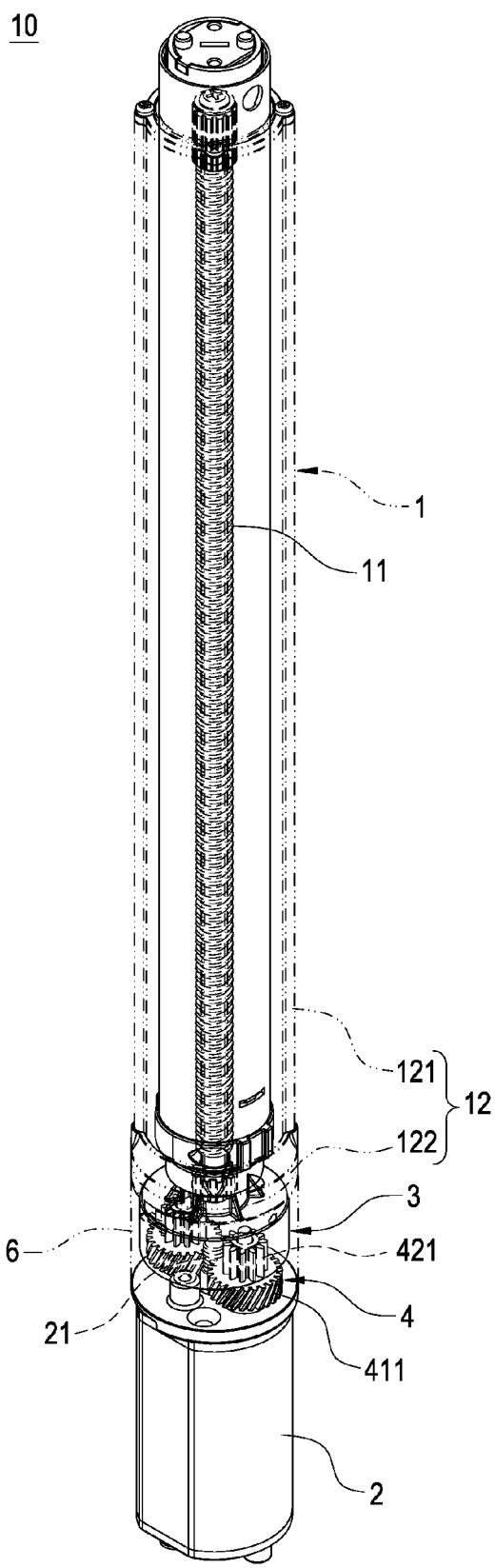
FIG. 2 is another perspective view showing the assembly of the actuator of the present invention.

The following provides detailed description of embodiments of the present invention along with the accompanied drawings. It can, however, be understood that the accompanied drawings are provided for illustrative purposes only and shall not be treated as limitations to the present invention.

As shown in FIG. 1 to FIG. 11, the present invention provides an actuator with multi-stage gears, and the actuator 10 comprises a worm gear shaft driving assembly 1, an electric motor 2, annulus gear 3 and a plurality of multi-stage gears 4.

The worm gear shaft driving assembly 1 comprises a worm gear shaft 11, an inner tube 12 and a driving shaft 13. The worm gear shaft 11 is arranged inside the inner tube 12 and is secured onto a relative location of the inner tube 12. The driving shaft 13 is arranged between the worm gear shaft 11 and the inner tube 12, and the driving shaft 13 is engaged with the worm gear shaft 11 relatively for transmission, which means when the worm gear shaft 11 rotates axially, the worm gear shaft 11 would drive the driving shaft 13 to rotate axially as well.

Furthermore, the inner tube 12 is constructed by a tubular body 121 and a cover 122. The worm gear shaft 11 is arranged inside the tubular body 121, the cover 122 covers onto the tubular body 121 correspondingly, and the cover 122 allows the end portions of the worm gear shaft 11 to be exposed.

The electric motor 2 comprises a transmission shaft 21. The electric motor 2 outputs a power to the transmission shaft 21 in order to drive the transmission shaft 21 to rotate axially.

The annulus gear 3 is arranged between the worm gear shaft 11 and the transmission shaft 21. The annulus gear 3 comprises an inner gear 31 on one end thereof and a moving end 32 actuated cooperatively with the inner gear 31 on another end thereof. The moving end 32 is connected to the worm gear shaft 11 and drives the worm gear shaft 11 to rotate.

Please refer to further details below. The annulus gear 3 comprises a main body 33 and a positioning piece 34. The moving end 32 extends outward from the main body 33 and is formed thereon. One end of the main body 33 away from the moving end 32 comprises a groove 331. The groove 331 comprises an inner ring wall 332 on an inner circumferential edge thereof. The inner gear 31 is formed on a surface of the inner ring wall 332. In addition, the positioning piece 34 is secured onto the bottom surface 333 of the groove 331, and the positioning piece 34 comprises a plurality of restriction holes 341 provided thereon.

Each one of the multi-stage gears 4 is arranged between the transmission shaft 21 and the inner gear 31. Each one of the multi-stage gears 4 comprises a first outer diameter portion 41 and a second outer diameter portion 42. The first outer diameter portion 41 comprises a helical gear 411 on an outer circumferential edge thereof; the second outer diameter portion 42 comprises a spur gear 421 on an outer circumferential edge thereof. Each helical gear 411 is engaged with the transmission shaft 21 correspondingly arranged at the inner portion thereof. Each spur gear 421 is engaged with the inner gear 31 correspondingly arranged at the outer portion thereof.

Figure 3:
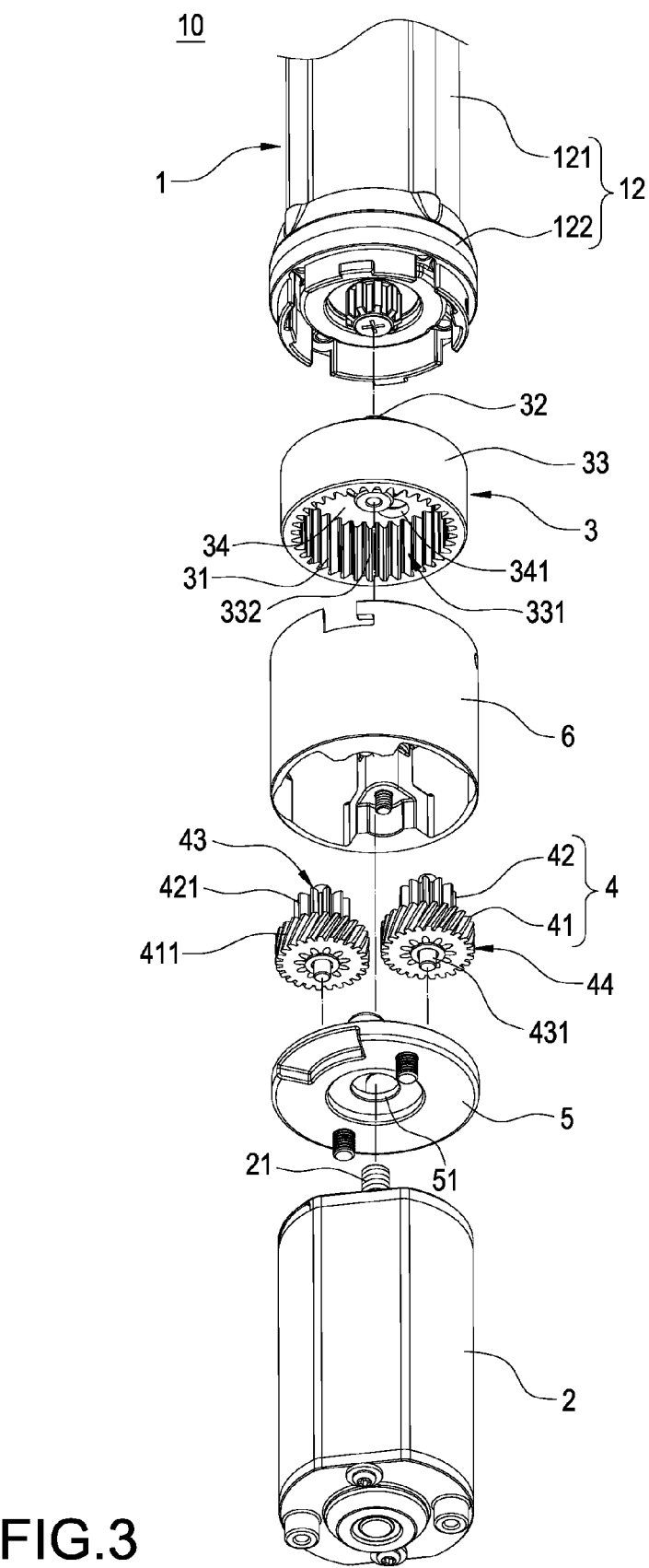
FIG. 3 is an exploded view showing the components of the actuator of the present invention.
Figure 4:
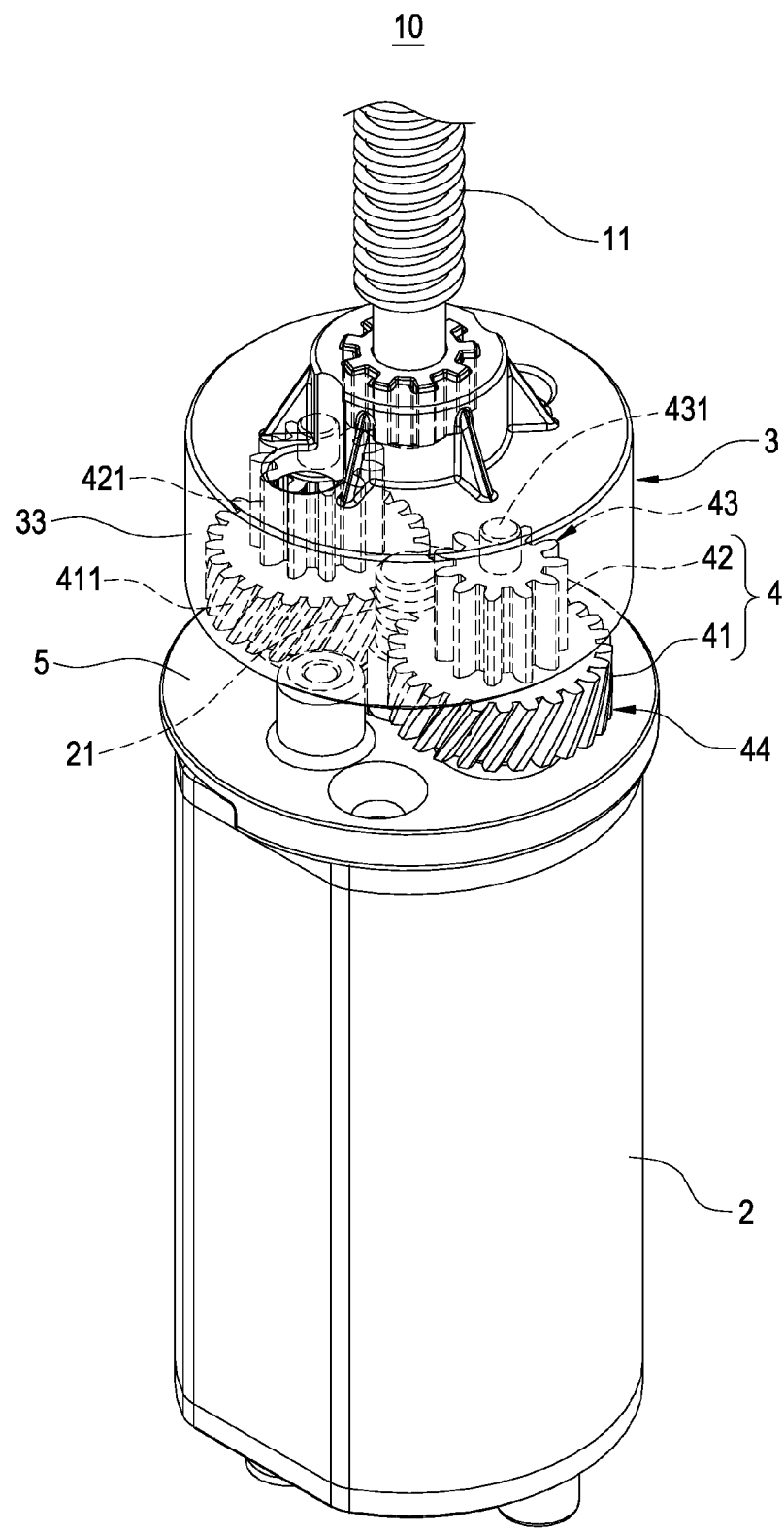
FIG. 4 is an illustration showing the partial assembly of the actuator of the present invention.
Figure 5:
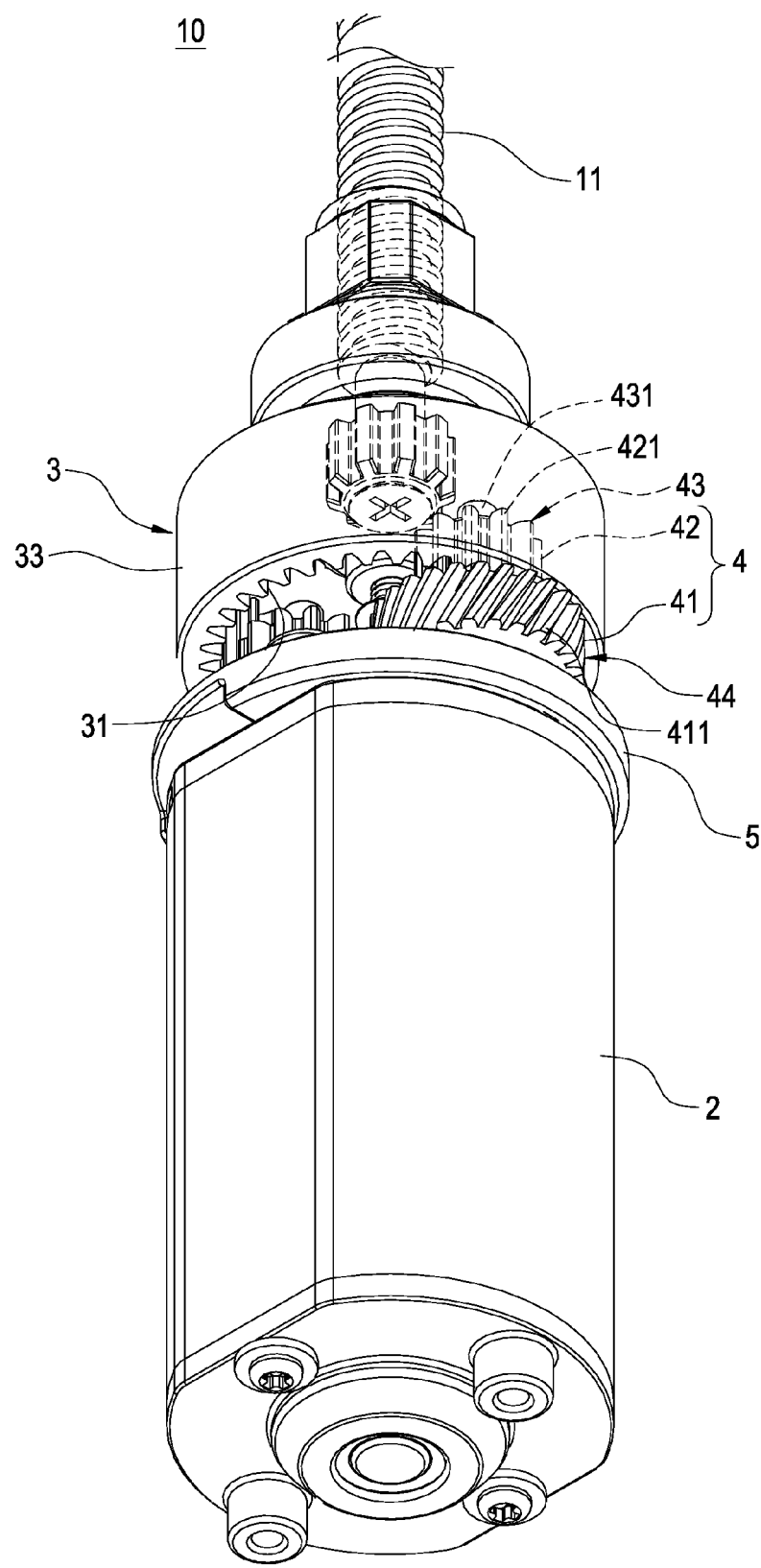
FIG. 5 is another illustration showing the partial assembly of the actuator of the present invention.

Furthermore, each one of the multi-stage gear 4 can be made of a metal shaft; or, as shown in FIG. 3, each one of the multi-stage gear 4 can be constructed by a metal shaft 43 and a plastic ring 44 connected to the circumferential edge of the metal shaft 43 via an injection molding method. The first outer diameter portion 41 is formed on the plastic ring 44, the second diameter portion 42 is formed on the metal shaft 43 and each one of the metal shafts 43 comprises two pivots 431 extended on two ends thereof.

Accordingly, a diameter of the first outer diameter portion 41 can be greater, smaller or equal to a diameter of the second outer diameter portion 42. However, as shown in FIG. 3, in a preferred embodiment of the multi-stage gears 4 of the present invention, the diameter of the first outer diameter portion 41 is greater than the diameter of the second outer diameter portion 42.

Figure 6:
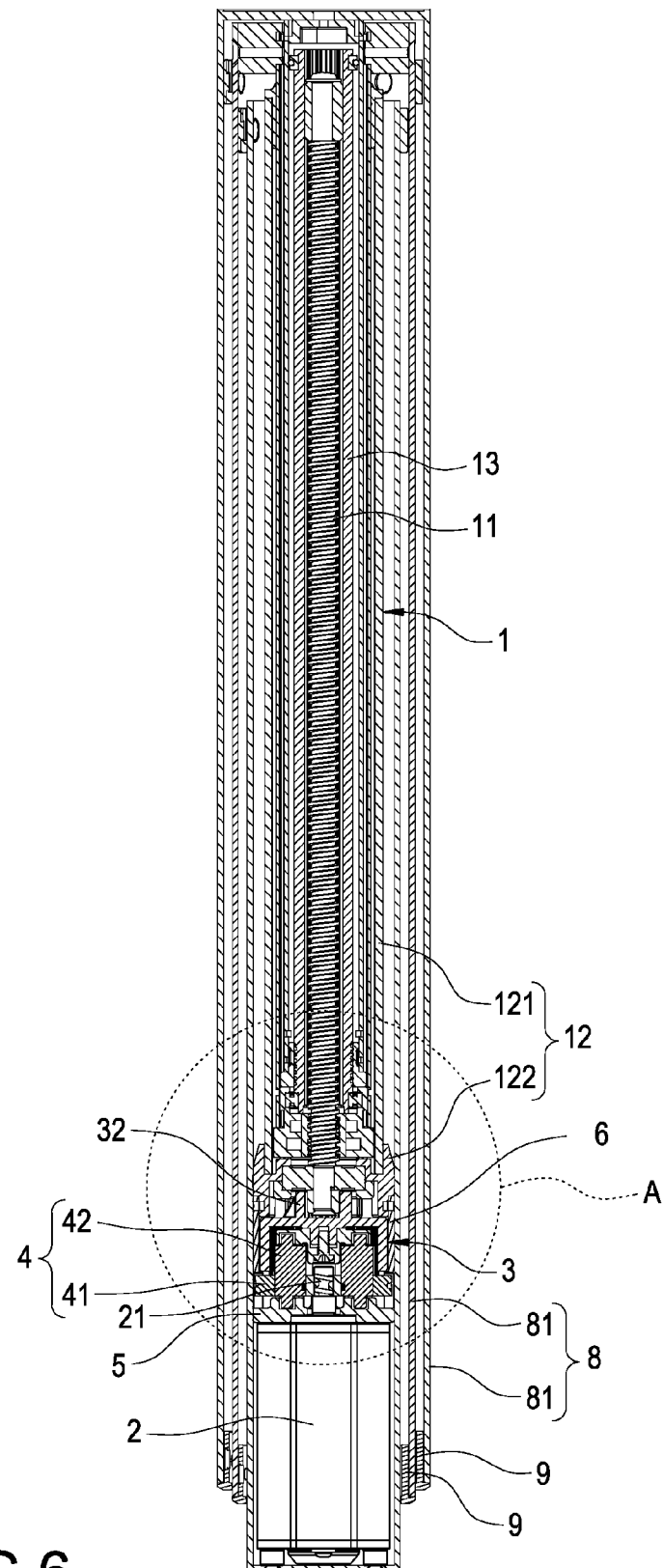
FIG. 6 is a cross sectional view of the actuator of the present invention.
Figure 7:
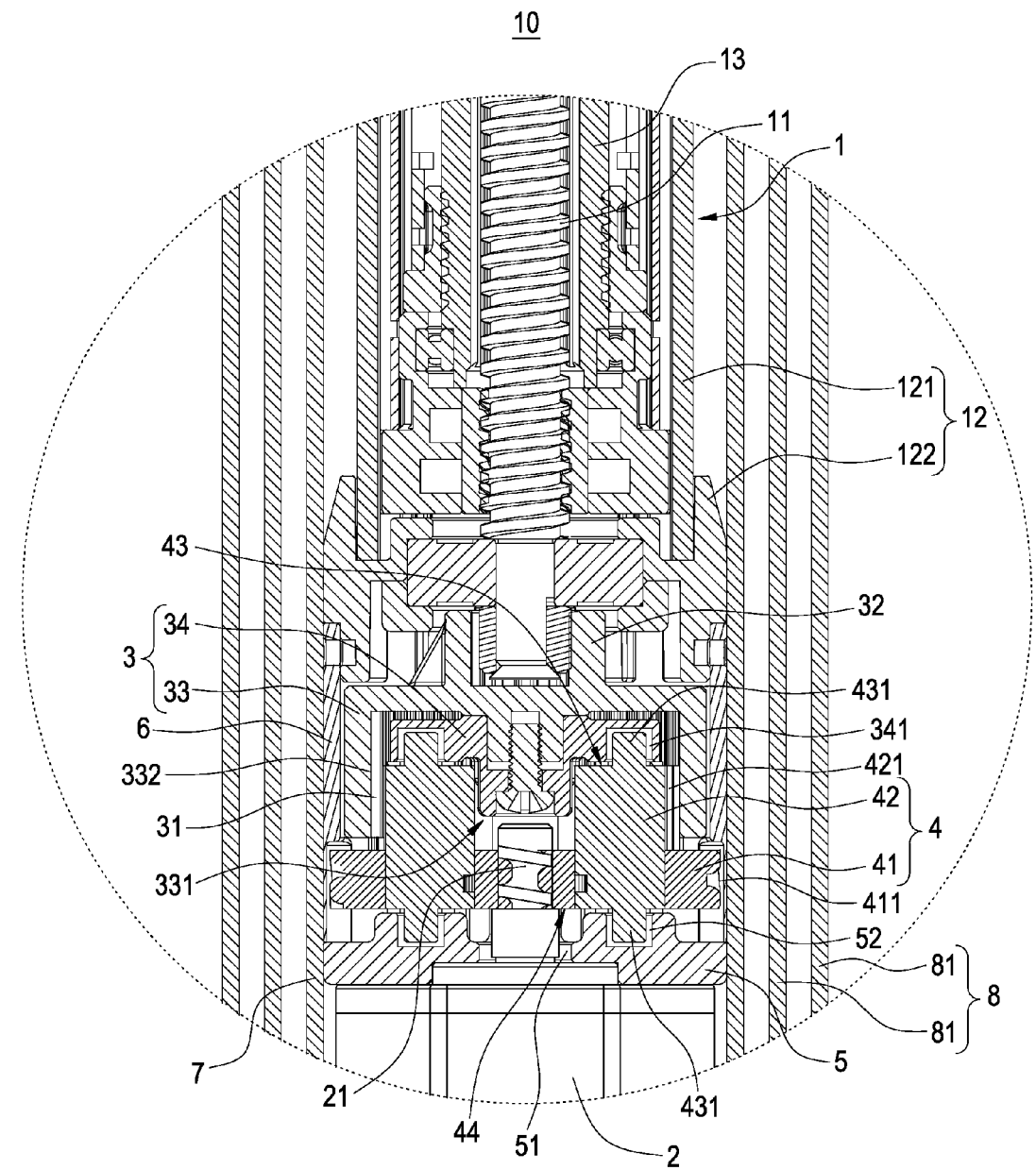
FIG. 7 is a cross sectional view of part A in FIG. 6.

As shown in FIGS. 3 and 6 to 7, the actuator 10 of the present invention further comprises a securement base 5. The securement base 5 comprises a through hole 51 and a plurality of restriction through holes 52. The electric motor 2 is secured onto the securement base 5 and the transmission shaft 21 penetrates through the through hole 51 to be restricted thereon. In addition, one of the pivots 431 is pivotally connected to the restriction through hole 52 correspondingly and another of the pivots 431 is pivotally connected to said restriction hole 341 correspondingly.

As shown in FIGS. 3 and 6 to 7, the actuator 10 of the present invention further comprises a gear box 6; the gear box 6 is secured between the securement base 5 and said inner tube 12, which means the gear box 6 is secured between the securement base 5 and the cover 122, and the annulus gear 3 and the plurality of multi-stage gears 4 are received inside the gear box 6.

As shown in FIGS. 6 to 7, the actuator 10 of the present invention further comprises an outer tube 7. The outer tube 7 is arranged at an outer portion of the worm gear shaft driving assembly 1, the electric motor 2, the annulus gear 3, the securement base 5 and the gear box 6 such that the worm gear shaft driving assembly 1, the electric motor 2, the annulus gear 3, the securement base 5 and the gear box 6 are received inside the outer tube 7.

Figure 9:
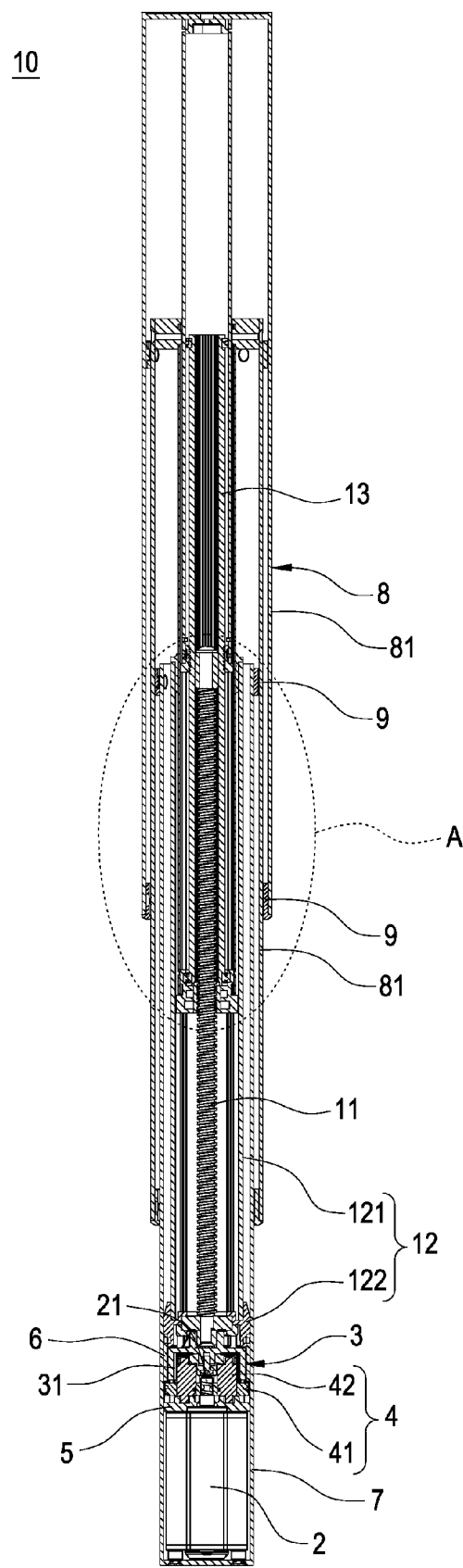
FIG. 9 is another cross sectional view of the actuator of the present invention.
Figure 10:
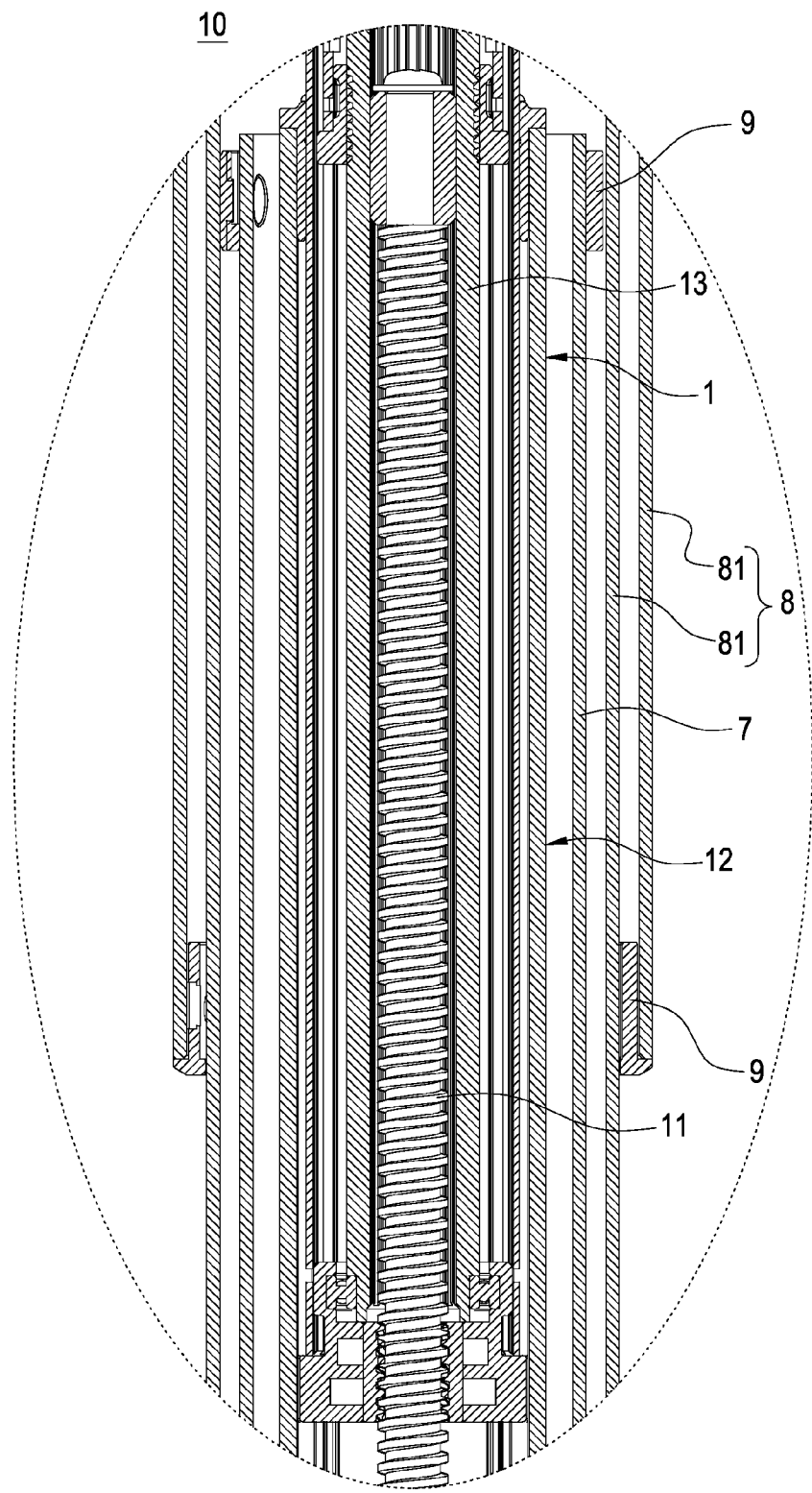
FIG. 10 is a cross sectional view of part A in FIG. 9.
Figure 11:
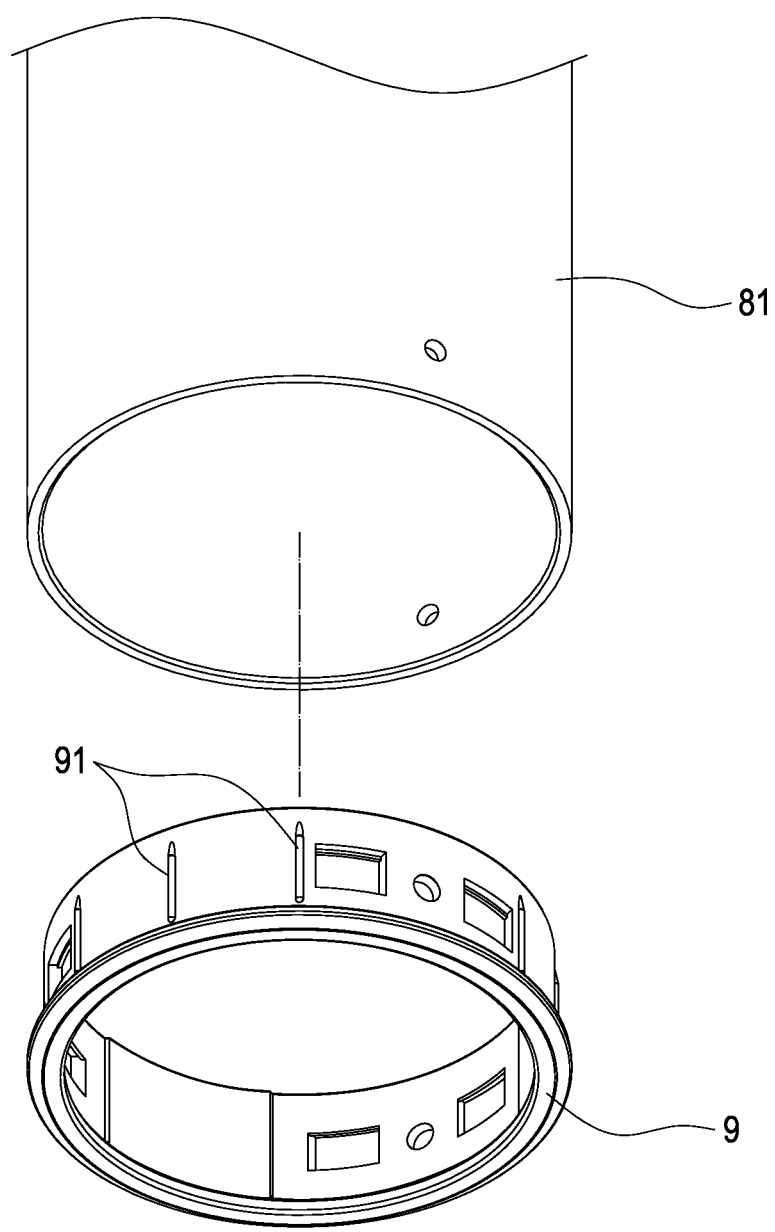
FIG. 11 is another illustration showing the partial assembly of the actuator of the present invention.

As shown in FIGS. 9 to 11, the actuator 10 of the present invention further comprises an extendable cylinder assembly 8 and a plurality of anti-sway rings 9. The extendable cylinder assembly 8 is mounted on an outer portion of said outer tube; said extendable cylinder assembly 8 is constructed by a plurality of cylinders 81 mounted onto each other sequentially, and the final end of the cylinder 81 is connected to the driving shaft 13 to be actuated together with the driving shaft 13 in order to allow each one of the cylinders 81 to slide relative to each other. The anti-sway rings 9 are provided between two adjacent cylinders 81. The anti-sway rings 9 are also provided between the outer tube 7 and the cylinders 81 adjacent thereto.

Each one of the anti-sway rings 9 is made of a plastic or metal material but is not limited to such materials only. Each one of the anti-sway rings 9 comprises a plurality of protruding strips 91 extended outward from an outer circumferential edge thereof. The cylinders 81 are mounted onto the anti-sway rings 9 correspondingly and are pressed by the plurality of protruding strips 91 to form grooves in order to rub against the plurality of protruding strips 91. The protruding strips 91 and the grooves are locked against with each other such that the cylinders 81 are pressed firmly by the plurality of protruding strips 91 in position and are rigidly attached with the anti-sway rings 9.

As shown in FIGS. 4 to 7, the assembly of the actuator 10 of the present invention utilizes the worm gear shaft driving assembly 1 comprising the worm gear shaft 11; the electric motor 2 having the transmission shaft 21; the annulus gear 3 arranged between the worm gear shaft 11 and the transmission shaft 21; the annulus gear 3 having an inner gear 31 on one end thereof and a moving end 32 actuated cooperatively with the inner gear 31; the moving end 32 connected to the worm gear shaft 11 and driving the worm gear 11 to rotate; each multi-stage gear 4 arranged between the transmission shaft 21 and the inner gear 31; each one of the multi-stage gears 4 having the first outer diameter portion 41 and the second outer diameter portion 42; the first outer diameter 41 comprising the helical gear 411 on the outer circumferential edge thereof; the second outer diameter portion 42 comprising the spur gear 421 on the outer circumferential edge thereof; each helical gear 411 engaged with the transmission shaft 21 correspondingly; each spur gear 421 engaged with the inner gear 31 correspondingly. Accordingly, by using the multi-stage gears 4 in replacement of the sun gear and the planetary gear of known actuator, the components of the actuator 10 of the present invention are simplified such that the effect of allowing the actuator 10 to have a reduced volume can be achieved.

Figure 8:
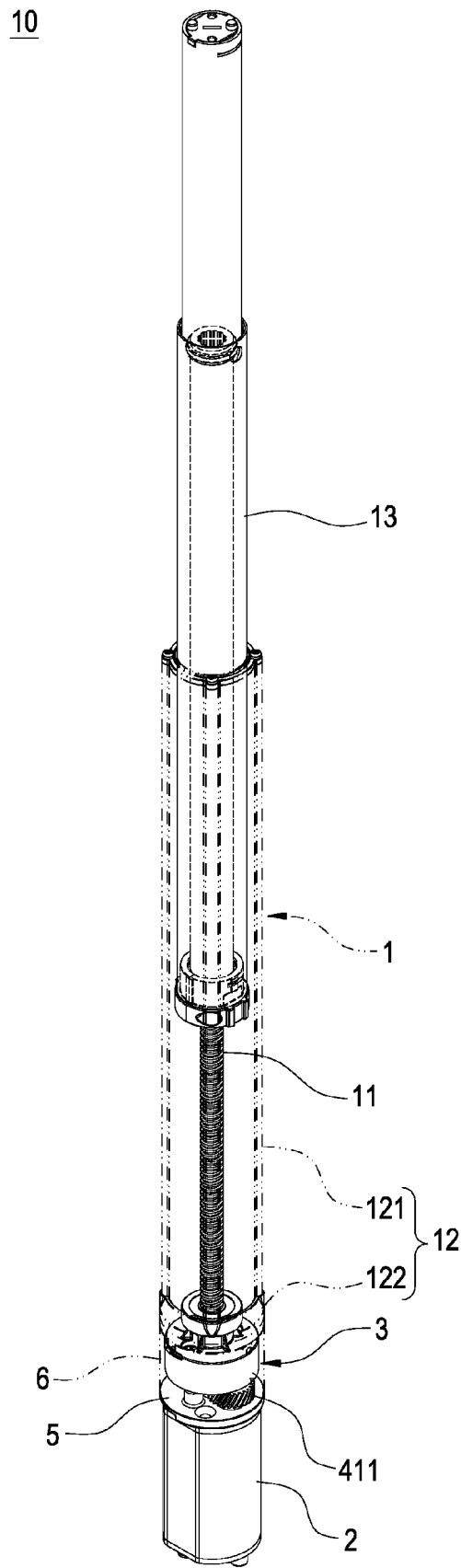
FIG. 8 is an illustration showing the state of use of the actuator of the present invention.

As shown in FIGS. 6 to 8, for the use of the actuator 10 of the present invention, it utilizes each one of the multi-stage gears 4 having the first outer diameter portion 41 and the second outer diameter portion 42, the first outer diameter portion 41 comprising the helical gear 411 on the outer circumferential edge thereof, the second outer diameter portion 42 comprising the spur gear 421 on the outer diameter thereof, each helical gear 411 engaged with the transmission shaft 21 correspondingly; each spur gear 421 engaged with the inner gear 31 correspondingly and such that the worm gear shaft driving assembly 1 is connected to the electric motor 2 via each one of the multi-stage gears 4 and the annulus gear 3 in order to allow the transmission shaft 21 to stably drive the worm gear 11 to rotate and to allow the worm gear shaft 11 to drive the driving shaft 13 to move axially.

However, for known actuators, most of the worm gear shaft driving assembly is connected to the electric motor via planetary gear assembly, and such planetary gear assembly comprises an annulus gear, a sun gear and a plurality of planetary gears; wherein the inner edge of the annulus gear comprises an inner gear, and the sun gear and the plurality of planetary gear must be aligned in parallel with each other inside the annulus gear in order to allow the plurality of planetary gears to engage with the inner gear and the sun gear, which causes the outer diameter of the annulus gear to be maintained at a predefined value without the possibility of being reduced in size; otherwise, the sun gear and the planetary gears would not be able to fit into the inner portion thereof.

In comparison with the known arts, the inner portion of the annulus gear 3 of the present invention requires to receive a number of spur gears 421 only without the use of the sun gear component of known actuators such that the outer diameter of the annulus gear 3 can be effectively reduced in order to allow the actuator 10 of the present invention to have the merits of simplified components and reduced volume.

In addition, in order to achieve the stable transmission between the worm gear shaft driving assembly 1 and the electric motor 2, each one of the multi-stage gears 4 having the first outer diameter portion and the second outer diameter portion 42, the first outer diameter portion 41 comprising the helical gear 411 on the outer circumferential edge thereof, the second outer diameter portion 42 comprising the spur gear 421 on the outer circumferential edge thereof, each helical gear 411 engaged with the transmission shaft 21 correspondingly, each spur gear 421 engaged with the inner gear 31 correspondingly and such that the spur gear 421 and the helical gear 411 are formed altogether on an identical component in order to allow the energy transfer between the spur gear 421 and the helical gear 411 to be more stable and to strength the transmission shaft 21 to stably transmit to the worm gear shaft 11 to rotate.

Also, each one of the multi-stage gears 4 can be constructed by the metal shaft 43 and the plastic ring 44 connected to the circumference of the metal shaft 43 via the injection molding method, in which the first outer diameter portion 41 is formed on the plastic ring 44 and the second outer diameter portion 42 is formed on the metal shaft 43. In comparison to engagement between the transmission shaft 21 and gears made of a metal material, the engagement between the transmission shaft 21 and the helical gear 411 of a plastic material of the present invention would generate less noise in order to achieve the effect of silence of the actuator of the present invention.

Furthermore, as shown in FIGS. 9 to 11, the actuator 10 of the present invention further comprises an extendable cylinder assembly 8 and anti-sway rings 9. The extendable cylinder assembly 8 actuates along with the driving shaft 13; the extendable cylinder assembly 8 is constructed by a plurality of cylinders 81 mounted onto each other sequentially. The anti-sway rings 9 are provided between two adjacent cylinders 81, and the anti-sway rings 9 are also provided between the adjacent outer tube 7 and the cylinders 81 in order to prevent sways of the cylinders 81.

Each one of the anti-sway rings 9 comprises a plurality of protruding strips 91 extended outward from an outer circumferential edge thereof. The cylinders 81 are mounted onto the anti-sway rings 9 correspondingly and are pressed by the plurality of protruding strips 91 to form grooves in order to rub against the plurality of protruding strips 91. The protruding strips 91 and the grooves are locked against with each other such that the cylinders 81 are pressed firmly by the plurality of protruding strips 91 in position such that the precise cooperation between the cylinders 81 and the anti-sway rings 9 can be achieved.

In view of the above, the actuator with multi-stage gears of the present invention is able to achieve the objectives expected and to overcome the drawbacks of known arts, which is of utility, novelty and inventive step complying with the requirements of patentability and is applied legitimately for the grant of the patent right to ensure protection of the rights of the inventor.

What is claimed is:

1. An actuator with multi-stage gears, comprising:
   a worm gear shaft driving assembly comprising a worm gear shaft;
   an electric motor having a transmission shaft;
   an annulus gear arranged between said worm gear shaft and said transmission shaft; said annulus gear comprising an inner gear on one end thereof and a moving end actuated cooperatively with said inner gear on another end thereof; said moving end connected to said worm gear shaft and driving said worm gear shaft to rotate; and
   a plurality of multi-stage gears arranged between said transmission shaft and said inner gear; each one of said plurality of multi-stage gears having a first outer diameter portion and a second outer diameter portion; said first outer diameter portion comprising a helical gear on an outer circumferential edge thereof; said second outer diameter portion comprising a spur gear on an outer circumferential edge thereof; said helical gears engaged with said transmission shaft correspondingly; said spur gears engaged with said inner gear correspondingly,
   wherein said first outer diameter portion is of a diameter greater than a diameter of said second outer diameter portion;
   wherein each one of said plurality of multi-stage gears is constructed by a metal shaft and a plastic ring connected to a circumference of said metal shaft via an injection molding method; said first outer diameter portion is formed on said plastic ring; said second outer diameter portion is formed on said metal shaft.

2. The actuator with multi-stage gears according to claim 1, further comprising a securement base; said securement base comprises a through hole and a plurality of restriction through holes; said annulus gear comprises a plurality of restriction holes; said electric motor is secured onto said securement base and said transmission shaft penetrates through said through hole correspondingly to be restricted thereon; each one of said metal shafts comprises two pivots extended on two ends thereof, one of said pivots is pivotally connected to said restriction through hole correspondingly and another of said pivots is pivotally connected to said restriction hole correspondingly.

3. The actuator with multi-stage gears according to claim 1, further comprising a gear box; said worm gear shaft driving assembly further comprises an inner tube, said worm gear shaft is arranged inside said inner tube and said gear box is secured between the securement base and said inner tube, and said annulus gear and said plurality of multi-stage gears are received inside said gear box.

4. The actuator with multi-stage gears according to claim 1, wherein said annulus gear comprises a main body; said moving end extends outward from said main body and formed thereon; said main body comprises a groove on one end away from said moving end; said groove comprises an inner ring wall at an inner circumferential edge thereof; said inner gear is formed on a surface of said inner ring wall.

5. The actuator with multi-stage gears according to claim 4, wherein said annulus gear further comprises a positioning piece; said positioning piece is secured at a bottom surface of said groove, and said positioning piece comprises a plurality of restriction holes provided thereon.

6. The actuator with multi-stage gears according to claim 1, further comprising an outer tube; wherein, said worm gear shaft driving assembly further comprises a driving shaft; said worm gear shaft is arranged inside said outer tube; said driving shaft is provided between said worm gear shaft and said outer tube, and said driving shaft is engaged with said worm gear shaft correspondingly for transmission.

7. The actuator with multi-stage gears according to claim 6, further comprising an extendable cylinder assembly and a plurality of anti-sway rings; wherein, said extendable cylinder assembly is mounted on an outer portion of said outer tube; said extendable cylinder assembly is constructed by a plurality of cylinders mounted onto each other sequentially; each one of said anti-sway rings is provided between each one of said cylinders and said outer tube adjacent thereto.

8. The actuator with multi-stage gears according to claim 7, wherein each one of said anti-sway rings comprises a plurality of protruding strips protruded outward from an outer circumferential edge thereof; said cylinders are correspondingly mounted onto said anti-sway rings and are pressed firmly by said plurality of protruding strips in position.

9. An actuator with multi-stage gears, comprising:
a worm gear shaft driving assembly comprising a worm gear shaft;
an electric motor having a transmission shaft;
an annulus gear arranged between said worm gear shaft and said transmission shaft; said annulus gear comprising an inner gear on one end thereof and a moving end actuated cooperatively with said inner gear on another end thereof; said moving end connected to said worm gear shaft and driving said worm gear shaft to rotate; and
a plurality of multi-stage gears arranged between said transmission shaft and said inner gear; each one of said plurality of multi-stage gears having a first outer diameter portion and a second outer diameter portion; said first outer diameter portion comprising a helical gear on an outer circumferential edge thereof; said second outer diameter portion comprising a spur gear on an outer circumferential edge thereof; said helical gears engaged with said transmission shaft correspondingly; said spur gears engaged with said inner gear correspondingly,
wherein each one of said plurality of multi-stage gears is constructed by a metal shaft and a plastic ring connected to a circumference of said metal shaft via an injection molding method; said first outer diameter portion is formed on said plastic ring; said second outer diameter portion is formed on said metal shaft.

10. The actuator with multi-stage gears according to claim 9, further comprising a securement base; said securement base comprises a through hole and a plurality of restriction through holes; said annulus gear comprises a plurality of restriction holes; said electric motor is secured onto said securement base and said transmission shaft penetrates through said through hole correspondingly to be restricted thereon; each one of said metal shafts comprises two pivots extended on two ends thereof, one of said pivots is pivotally connected to said restriction through hole correspondingly and another of said pivots is pivotally connected to said restriction hole correspondingly.

11. The actuator with multi-stage gears according to claim 10, further comprising a gear box; wherein said worm gear shaft driving assembly further comprises an inner tube, said worm gear is arranged inside said inner tube and said gear box is secured between the securement base and said inner tube, and said annulus gear and said plurality of multi-stage gears are received inside said gear box.

* * * * *